United States Patent
Cohn et al.

(10) Patent No.: US 12,133,256 B2
(45) Date of Patent: Oct. 29, 2024

(54) DYNAMIC TRANSMISSION BANDWIDTH SELECTION

(71) Applicant: Intel Corporation, Santa Clara, CA (US)

(72) Inventors: Daniel Cohn, Raanana (IL); Nir Balaban, Kfar Netter (IL); Dor Chay, Haifa (IL); Mordechay Goodstein, Jerusalem (IL)

(73) Assignee: Intel Corporation, Santa Clara, CA (US)

( * ) Notice: Subject to any disclaimer, the term of this patent is extended or adjusted under 35 U.S.C. 154(b) by 798 days.

(21) Appl. No.: 17/132,417

(22) Filed: Dec. 23, 2020

(65) Prior Publication Data

US 2022/0201755 A1 Jun. 23, 2022

(51) Int. Cl.
*H04W 74/0816* (2024.01)
*H04L 1/18* (2023.01)
*H04W 16/14* (2009.01)
*H04W 28/20* (2009.01)

(52) U.S. Cl.
CPC ........... *H04W 74/0816* (2013.01); *H04L 1/18* (2013.01); *H04W 16/14* (2013.01); *H04W 28/20* (2013.01)

(58) Field of Classification Search
CPC . H04W 74/0816; H04W 16/14; H04W 28/20; H04L 1/18
See application file for complete search history.

(56) References Cited

U.S. PATENT DOCUMENTS

| | | | |
|---|---|---|---|
| 2008/0212613 A1* | 9/2008 | Perkinson | H04L 47/125 370/475 |
| 2013/0301569 A1* | 11/2013 | Wang | H04L 1/1864 370/329 |
| 2018/0077725 A1* | 3/2018 | Sun | H04W 28/26 |
| 2018/0213568 A1* | 7/2018 | Gong | H04W 74/0816 |
| 2020/0275484 A1* | 8/2020 | Xu | H04W 72/0453 |
| 2021/0083831 A1* | 3/2021 | Jiang | H04L 5/0053 |
| 2021/0168864 A1* | 6/2021 | Seok | H04W 72/0446 |
| 2021/0195683 A1* | 6/2021 | Xin | H04W 4/70 |
| 2022/0070928 A1* | 3/2022 | Babaei | H04W 74/004 |

* cited by examiner

*Primary Examiner* — Deepa Belur
(74) *Attorney, Agent, or Firm* — Banner & Witcoff Ltd.

(57) ABSTRACT

A component of a wireless communication device configured for any of a plurality of transmission bandwidths. The component includes at least one processor; and a non-transitory processor-readable storage medium including instructions that, when executed by the at least one processor, cause the at least one processor to: monitor a Clear Channel Assessment (CCA) factor or a Request-to-Send (RTS) factor for each of the transmission bandwidths, wherein the CCA factor is a throughput impact estimate based on any CCA transmission deferrals, and the RTS factor is a throughput impact estimate based on any transmission deferrals due to unanswered RTS messages; and dynamically select, based on the CCA factor or the RTS factor, one of the transmission bandwidths that increases a throughput of the wireless communication device.

25 Claims, 3 Drawing Sheets

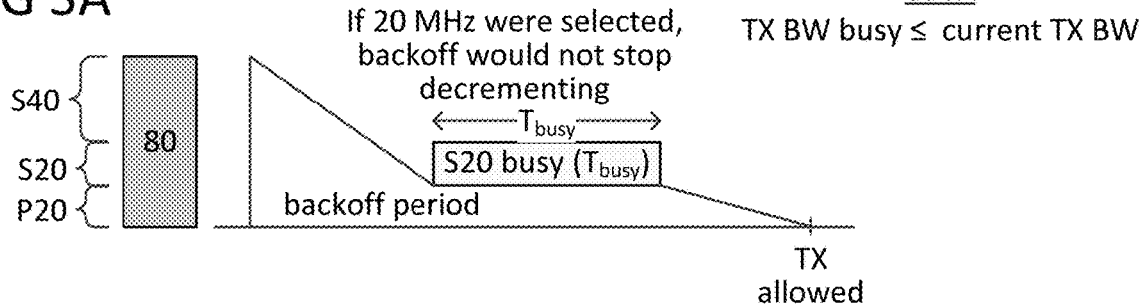
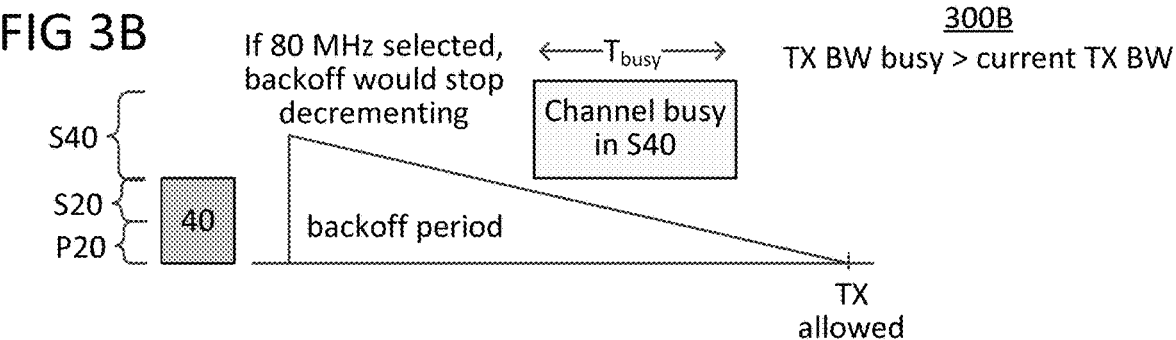
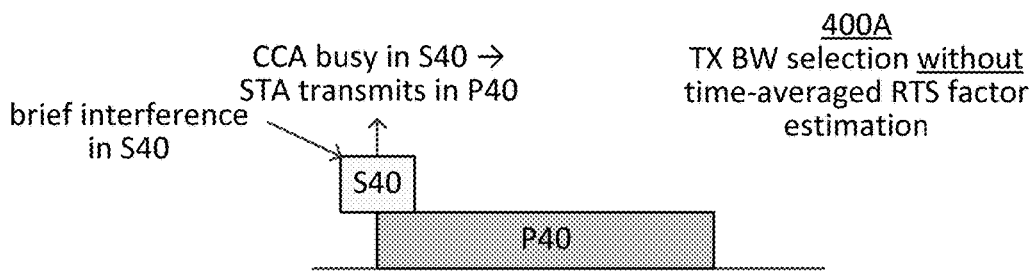
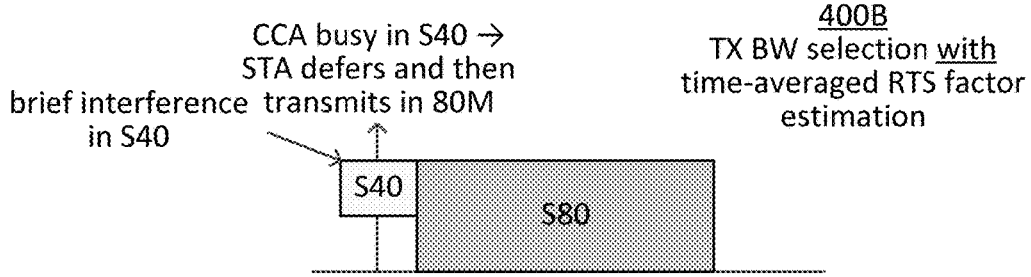

FIG 5

500
Method for transmission bandwidth selection

510
Monitoring a CCA factor or an RTS factor for each of the transmission bandwidths, wherein the CCA factor is a throughput impact estimate based on any CCA transmission deferrals, and the RTS factor is a throughput impact estimate based on any transmission deferrals due to unanswered RTS messages.

520
Dynamically selecting, based on the CCA factor or the RTS factor, one of the transmission bandwidths that increases a throughput of the wireless communication device.

FIG 6

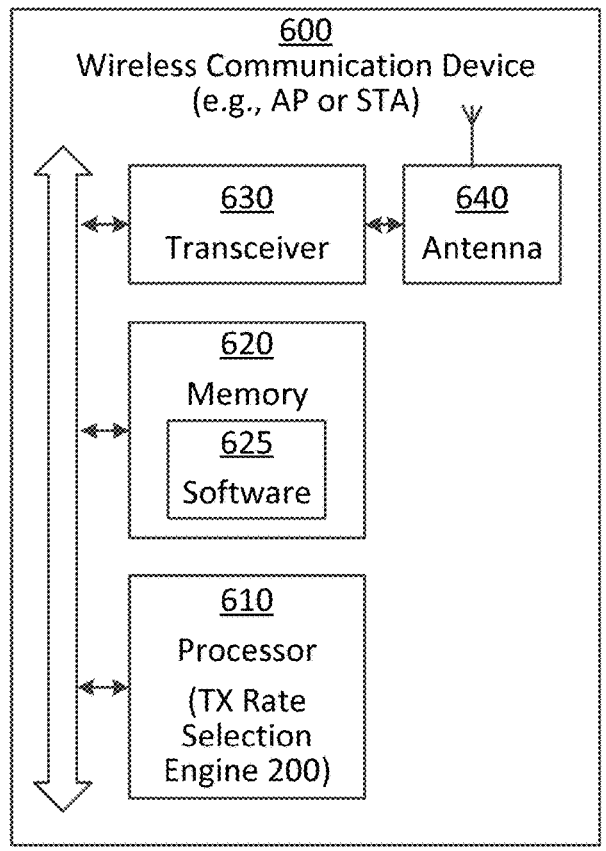

DYNAMIC TRANSMISSION BANDWIDTH SELECTION

TECHNICAL FIELD

The present disclosure generally relates to transmission bandwidth selection, and more specifically, to dynamic transmission bandwidth selection to increase throughput of a wireless communication device.

BACKGROUND

Multiple Access Points (APs) located in close proximity to one another and lacking frequency planning might transmit in partially overlapping transmission bandwidths (channels) when communicating with stations (STAB). In this scenario, it can be beneficial to communicate in a supported transmission bandwidth that is narrow enough to avoid the overlap. The resulting loss in transmission bandwidth may be more than offset by the gain due to interference avoidance.

BRIEF DESCRIPTION OF THE DRAWINGS

FIGS. 3A and 3B are timing diagrams illustrating exemplary Clear Channel Assessment (CCA) factor estimations in accordance with aspects of the disclosure.

FIGS. 4A and 4B are timing diagrams illustrating a comparison of transmission bandwidth selections with and without time-averaged RTS factor estimation.

FIG. 5 is a flowchart illustrating a dynamic transmission bandwidth selection method in accordance with aspects of the disclosure.

FIG. 6 is a block diagram illustrating an exemplary wireless communication device configured to dynamically select a transmission bandwidth that increases a throughput of the wireless communication device in accordance with various aspects of the disclosure.

DESCRIPTION OF THE ASPECTS

Figure 1:
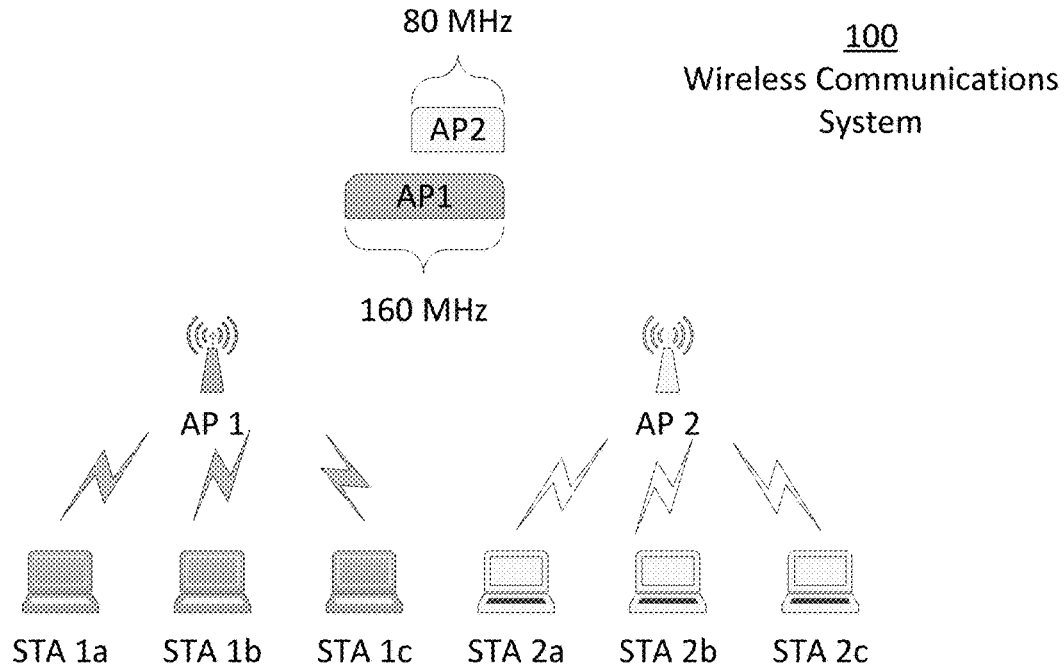
FIG. 1 is a diagram illustrating an exemplary wireless communication system of a dynamic transmission bandwidth selection in accordance with aspects of the disclosure.

FIG. 1 is a diagram illustrating an exemplary wireless communication system 100 of a dynamic transmission bandwidth selection in accordance with aspects of the disclosure.

A first access point AP1 and a second access point AP2, in the example shown, have overlapping transmission bandwidths of 160 MHz and 80 MHz, respectively. Each station STA is associated with an access point AP, which is in turn connected to another network (not shown). A station STA sends and receives its packets via an access point AP. A plurality of stations (STA 1a, STA 1b, STA 1c) are associated with the first access point AP1, and a plurality of stations (STA 2a, STA 2b, STA 2c) are associated with the second access point AP2. In this example, the first access point AP1 occupies a transmission bandwidth of 160 MHz, and the second access point AP2 is a heavy interferer occupying an overlapping transmission bandwidth of 80 MHz. In such a scenario it would be preferable for the first access point AP1 to transmit at half the transmission bandwidth, in the non-overlapping 80 MHz portion, to avoid interference.

The aspects disclosed herein are applicable to wireless communication devices, which include, for example, access points (APs) and their associated wireless stations (STAB). For ease of explanation, the disclosure will often refer to each of these wireless devices generically as a station. It is understood that unless stated otherwise, any description of aspects of an access point, wireless station, or simply a station is applicable to either type of wireless communication device. It is also contemplated that the concepts disclosed herein may be applicable to other wireless communication devices not specifically mentioned. The explicit disclosure of access points and wireless stations is for ease of explanation and not meant to be limiting.

A typical transmission bandwidth selection algorithm at a station selects transmission bandwidth based on Packet Error Rate (PER) estimated at each supported transmission bandwidth. The transmission bandwidth is selected to maximize estimated effective throughput, wherein throughput is a function of the transmission rate and error rate. In addition, Wireless Local Area Network (WLAN) standards, such as IEEE 802.11, define transmission bandwidth signaling schemes to identify interference in portions of the transmission bandwidth.

This typical transmission bandwidth selection algorithm may be effective in interference-free environments, but in congested environments there are other factors that impact throughput and latency. One factor is listen-before-talk schemes where interference causes the station to defer transmissions. Also, if a transmitting station uses a Request-To-Send (RTS)/Clear-To-Send (CTS) mechanism, and the transmitting station's communication partner is affected by interference, the communication partner may not respond to RTS messages, resulting in the transmitting station deferring transmissions. In congested scenarios these CCA and RTS/CTS factors are highly dependent on the selected transmission bandwidth. And because these factors do not result in packet errors, the typical transmission bandwidth selection algorithm does not factor in packet error.

Further, the typical transmission bandwidth signaling scheme reports interference only when an interference energy level is above a fixed threshold. The actual impact of the interference depends not only on its absolute energy level, but also on the interference energy level relative to the energy level of the transmitted signal. For example, the threshold for reporting interference for a 160 MHz channel width is −73 dBm; interference signals received with −74 dBm and −90 dBm power would result in the same interference reporting even though interference impact on packet reception is different.

Overview of Dynamic Transmission Bandwidth Selection

By way of overview, the transmission bandwidth selection scheme disclosed herein first monitors both Clear Channel Assessment (CCA) deferrals and unanswered Request-To-Send (RTS) transmissions for each supported transmission bandwidth. The selection scheme then estimates the impact of each of the CCA and RTS factors on throughput. Finally, the CCA and RTS impact estimates are combined with the typical Packet Error Rate (PER) impact estimate into a single throughput estimate used to dynamically select the transmission bandwidth that increases, but preferably maximizes, the throughput. The result is a significantly higher throughput and lower latency in congested transmission environments.

The "transmission bandwidth" may be referred to herein as "transmission bandwidth" or simply as "bandwidth." "Rate" or "transmission rate" as discussed herein, denotes a set of transmission parameters which may include any one or more of Modulation and Coding Scheme (MCS), Number of Spatial Streams (NSS), Guard Interval (GI), and transmission bandwidth, among others.

Figure 2:
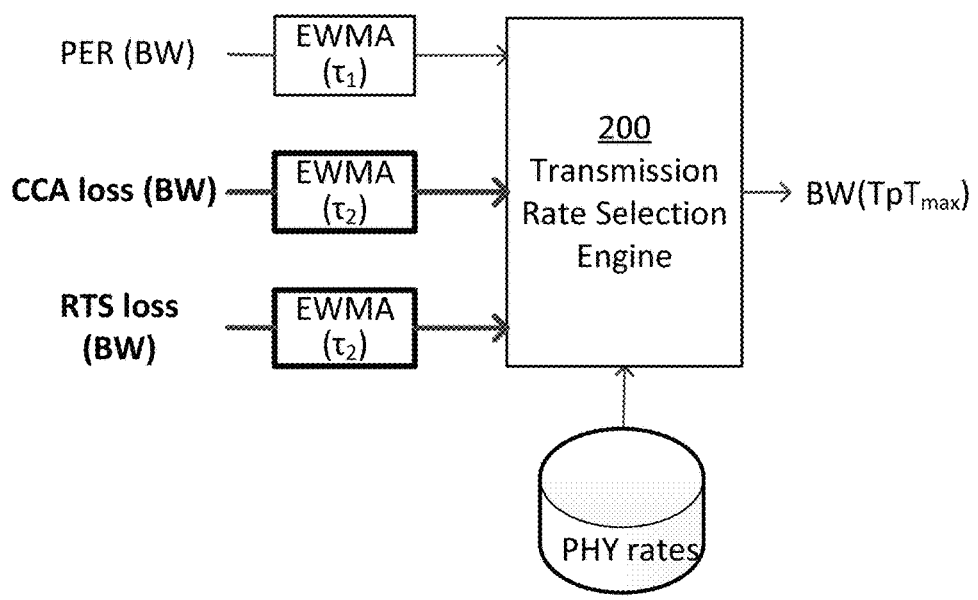
FIG. 2 is a block diagram illustrating an exemplary transmission rate selection engine in accordance with aspects of the disclosure.

FIG. 2 is a block diagram illustrating an exemplary transmission rate selection engine 200 in accordance with aspects of the disclosure.

Packet Error Rate (PER)

A typical transmission rate selection algorithm is based on estimating PER for different transmission rates, and then selecting the transmission rate that maximizes throughput, sometimes with latency constraints by limiting a maximum permitted number of retransmissions. Transmission rate r maximizing throughput may be expressed as follows:

$$r = \mathrm{argmax}[r_i(1-PER_i)] | PER < PER_{max}, \quad \text{(Equation 1)}$$

where $r_i$ is the Medium Access Control (MAC) throughput provided by transmission rate i, and $PER_i$ is the estimated PER incurred when using this transmission rate. The PER estimation is preferably averaged over time, for example, based on an exponentially weighted moving average (EWMA).

Dynamic Transmission Bandwidth Selection
(PER+CCA Factor+RTS Factor)

The transmission bandwidth selection scheme, as disclosed herein, takes into consideration not only PER, but also two additional estimation factors:

1. CCA factor, which estimates the throughput impact of deferring transmissions due to CCA busy; and
2. RTS factor, which estimates the throughput impact of deferring transmissions due to unanswered RTS.

As with PER, each of the CCA factor and RTS factor are preferably averaged over time, for example based on an EWMA.

With these estimation factors, the transmission bandwidth selection scheme selects the transmission bandwidth that maximizes throughput (TpT) based on the following:

$$TpT_{max} = r_i(1-PER_i)(1-\mathrm{ccaFactor}_i)(1-\mathrm{rtsFactor}_i). \quad \text{(Equation 2)}$$

The ccaFactor, is, as discussed in further detail below, an estimate of time lost (CCA loss) to the CCA transmission deferrals as compared with a currently selected transmission bandwidth, divided by total available transmission time. And $rtsFactor_i$ is an estimate of time lost to transmission deferral due to the one or more unanswered RTS messages (RTS loss), divided by the total available transmission time.

CCA Factor

FIGS. 3A and 3B are timing diagrams illustrating exemplary Clear Channel Assessment (CCA) factor estimations 300 in accordance with aspects of the disclosure.

CCA is a typical mechanism for avoiding collisions by determining whether a transmission bandwidth (channel) is idle. The CCA includes carrier sensing and energy detection. The Carrier Sense (CS) mechanism consists of a physical CS and a virtual CS. The physical CS is provided by the physical layer (PHY), and is a measuring of the received signal strength (RSS) of a valid symbol. If the RSS is above a certain level, the transmission channel is considered busy. A station having a frame to send starts with a random backoff period. The station does not wait for a collision. The number of slots to backoff is chosen in a range 0 to 15, for example. The station waits until the transmission channel is idle, by sensing that there is no signal for a short period of time, and counts down idle slots, pausing when frames are sent. The station sends its frame when the counter reaches O. If the frame is received by a communicating partner successfully, the communication partner immediately sends a short acknowledgement ACK. Lack of an acknowledgement ACK indicates an error, whether a collision or otherwise. In this case, the transmitting station doubles the backoff period and tries again until the frame has been successfully received and acknowledged, or the maximum number of retransmissions has been reached.

For example, assume station STA 1a is the first to send a frame. While STA 1a is sending, STA 1b and STA 1c become ready to send. They see that the transmission channel is busy and wait for it to become idle. Shortly after STA 1a receives an acknowledgement ACK, the transmission channel goes idle. However, rather than sending a frame right away and colliding, STA 1b and STA 1c both perform a backoff. STA 1c picks a short backoff, and thus sends first. STA 1b pauses its countdown while it senses that STA 1c is using the transmission channel, and resumes after STA 1c has received an acknowledgement ACK. STA 1b soon completes its backoff and sends its frame.

By way of overview, the CCA factor ($\mathrm{ccaFactor}_{BW}$) for the different transmission bandwidths is estimated by estimating a CCA loss ($\mathrm{ccaLoss}_{BW}$), and then determining the CCA factor by dividing the CCA loss by a total available transmission time. The CCA loss is defined herein as time that would be lost to the CCA transmission deferrals if a particular transmission bandwidth were selected instead of a currently-selected transmission bandwidth.

For example, if a station is associated with a 160 MHz transmission bandwidth, the station estimates the CCA factor $\mathrm{ccaFactor}_{BW}$ for each of 20, 40, 80, and 160 MHz transmission bandwidths. The CCA loss (ccaLoss) estimation is based on a channel sense mechanism during the backoff procedure. The channel sense provides transmission channel busy indication for each of the available bandwidths, regardless of the transmission bandwidth currently selected.

FIGS. 3A and 3B are timing diagrams illustrating exemplary CCA factor estimations 300 when transmission channel busy is indicated for a transmission channel bandwidth that is lower than or equal to (FIG. 3A), or higher than (FIG. 3B), a currently selected transmission bandwidth. There is a different CCA loss for each of the transmission bandwidths.

FIG. 3A is a timing diagram illustrating an exemplary CCA factor estimation 300A when transmission channel busy is indicated for a transmission channel bandwidth that is lower than or equal to a currently selected transmission bandwidth. In this scenario, the backoff decrement is suspended until the transmission channel is free again. The CCA loss (ccaLoss) is estimated directly by incrementing the CCA loss by the amount of time the backoff decrement is suspended.

In the example shown in the figure, the station is configured up to and currently transmitting in an 80 MHz transmission channel, S80. The station plans to transmit in S80, and the secondary 20 MHz transmission channel, S20, is busy. The transmission channel S40 and transmission channel S80 have a bandwidth that is greater than the bandwidth of the transmission channel S20 that is busy. Transmitting at the 80 MHz or the 40 MHz transmission bandwidth would require waiting for the time S20 is busy ($T_{busy}$). $T_{busy}$ is thus added to a potential loss to transmit in S40 or S80, cca- Loss40 and ccaLoss80. The backoff timer count is stopped and will resume when S20 is free again. Contrary to S40 and S80, P20 has a bandwidth that is less than (less than or equal to) the bandwidth of the busy S20. Transmitting in P20 would not require waiting because the busy S20 channel is outside of the frequency rage of the P20 channel. $T_{busy}$ is not added to a potential loss for selecting to transmit in P20, that is, ccaLoss20.

Conversely, FIG. 3B is a timing diagram illustrating an exemplary CCA factor estimation 300B when transmission bandwidth busy is indicated for a transmission bandwidth higher than the transmission bandwidth of a currently selected transmission bandwidth. The backoff decrement in this case is not suspended.

In the example shown in the figure, the station is configured up to an 80 MHz transmission channel, S80, currently transmitting in a 40 MHz transmission channel, and channel busy is detected in the secondary 40 MHz transmission channel, S40. If the station selects to transmit in another 40 MHz or a 20 MHz transmission channel, there is no wait. But if the station selects to transmit in the 80 MHz channel, there is a wait. CCA loss (ccaLoss) is incremented by the duration of the channel busy indication ($T_{busy}$) for ccaLoss80, but not for ccaLoss20 or ccaLoss40.

The CCA factor for each available transmission bandwidth is then estimated as follows:

$$ccaFactor_{BW} = ccLoss_{BW}/txTime_{BW},\quad\text{(Equation 3)}$$

where $txTime_{BW}$ is the time the station would transmit in the respective transmission bandwidth. $txTime_{BW}$ is estimated by measuring the transmission time in the currently selected transmission bandwidth and subtracting $ccLoss_{BW}$–$ccLoss_{BWC}$.

The CCA loss is the respective CCA loss to be incurred if a different transmission bandwidth were selected. By way of example, assume the current transmission bandwidth is 40 MHz for 10 seconds, the 80 MHz transmission bandwidth would be interference-free for transmission for 7 seconds (CCA loss of 3 seconds transmission time), and the 20 MHz transmission bandwidth would be interference-free for transmission for 13 seconds (CCA gain of 3 seconds transmission time). The bandwidth transmission scheme determines how much time is wasted/saved based on transmission bandwidth choices, resulting in a CCA factor that provides a percentage of total time that would be wasted/saved in waiting for a transmission channel to be free.

RTS Factor

Similarly, to estimate the RTS factor, $rtsFactor_{bw}$, for the different transmission bandwidths, the transmission bandwidth selection scheme first estimates the RTS loss, $rtsLoss_{BW}$, which is the time lost to unanswered RTS due to interference. By way of overview, the RTS factor is monitored by estimating an RTS loss, and then determining the RTS factor by dividing the RTS loss by a total transmission time. The RTS loss is defined as time lost to the transmission deferral due to the one or more unanswered RTS messages.

RTS/CTS is a mechanism used to reduce collisions. For example, assume the RTS/CTS protocol starts when STA 1a decides it wants to send data to AP1. STA 1a begins by sending an RTS frame (message) to AP1 to request permission to send it a frame. If AP1 receives this request, it answers with a CTS frame to indicate that the channel is clear to send. Upon receipt of the CTS, STA 1a sends its frame and starts an acknowledgement timer. Upon correct receipt of the data frame, AP1 responds with an acknowledgement ACK frame, completing the exchange. If STA 1a's acknowledgement ACK time expiries before the acknowledgement ACK gets back to it, it is treated as a collision or interference, and the RTS/CTS protocol is performed again after a backoff.

In estimating the RTS factor, when the station transmits an RTS message but does not receive a CTS in response, the station generates a new backoff to retry the RTS transmission. The RTS loss ($rtsLoss_{BW}$) for each of the available transmission bandwidths is estimated by adding an average backoff period for every such event. The average backoff period is calculated as the contention window (CW) divided by two, plus an arbitration inter-frame spacing (AIFS) for each unanswered RTS message, as follows:

$$\text{Average backoff} = CW/2 + AIFS\quad\text{(Equation 4)}$$

AIFS is a method of prioritizing one Access Category (AC) over the other, such as giving voice or video priority over email. AIFS functions by shortening or expanding the period a station has to wait before it is allowed to transmit its next frame. A shorter AIFS period means a message has a higher probability of being transmitted with low latency. Finally, the RTS factor is estimated as follows:

$$rtsFactor_{BW} = rtsLossBW/txTime_{BW}.\quad\text{(Equation 5)}$$

Unlike the CCA factor, RTS factor can only be estimated for the transmission bandwidth currently selected. Therefore, RTS factor estimation for the other available transmission bandwidths is based on existing transmission rate selection algorithm explorations where the algorithm explores other transmission bandwidths to collect PER statistics, as well as on transmission bandwidth change decisions by the transmission bandwidth selection scheme disclosed herein.

FIGS. 4A and 4B are timing diagrams illustrating a comparison of transmission bandwidth selections without (FIG. 4A) and with (FIG. 4B) time-averaged RTS factor estimation.

Again, the CCA factor and the RTS factor are preferably averaged over time before being used for transmission bandwidth selection decisions. The average may be an exponentially weighted moving average (EWMA), for example. The averaging filter time constant will typically be higher than the averaging time used for PER statistics since the interference map typically changes slower than transmission link conditions.

It is preferable to, before switching transmission bandwidths, consider PER and RTS factors of other transmission bandwidths, and average the PERs and RTS factors over time. Interference patterns generally do not change as quickly as PERs, so PER and RTS factor are filtered with different time constants.

In the examples shown, if a station configured up to 80 MHz transmission bandwidth has strong interference by a secondary 40 MHz transmission channel, the station cannot transmit (CCA busy) when the interfering secondary 40 MHz transmission channel is active. Assume that the interfering secondary 40 MHz transmission channel transmits a 5.4 ms aggregation every 8 ms on average, the average transmission time is 67.5%. And with best link conditions with no interference, the physical layer transmission rate would be 1201 Mbps. If with the interference the 80 MHz transmission bandwidth is chosen, the CCA factor impact of 67.5 on the effective physical layer transmission rate of 390 Mbs {1201 Mbps*(1−0.675)} due to waiting for the transmission channel to become free. If, instead, the station transmits on a different 40 MHz transmission bandwidth and completely avoids the interfering secondary 40 MHz transmission channel, the transmission rate is roughly 574 Mbs (roughly 1201 Mbps divided by 2), which is higher than the 390 Mbps. In this case the transmission bandwidth selection scheme, when it considers only the CCA factor without the RTS factor, would choose the narrower 40 MHz transmission bandwidth, as shown in FIG. 4A.

This simpler solution where the station selects the transmission bandwidth for every packet based on the results of the channel sense performed before the transmission, as in this case without considering the average RTS factor, is not an effective solution because the transmission channel sense at the station does not provide any information regarding interference at a peer station, so the transmissions may still fail. Also, correlation between channel sense before transmission and the interference presence during transmission is typically low, and thus the station may unnecessarily choose a low transmission bandwidth merely because of a short burst of interference, as shown in FIG. 4A, when it would have been more efficient to wait for the interference to pass and then transmit in a higher bandwidth, as shown in FIG. 4B. The transmission bandwidth selection scheme as proposed herein, considering not only a CCA factor average, but also PER and the RTS factor averaged over time, maximizes throughput as shown in FIG. 4B.

FIG. 5 is a flowchart illustrating a dynamic transmission bandwidth selection method 500 in accordance with aspects of the disclosure.

At block 510, a Clear Channel Assessment (CCA) factor or a Request-to-Send (RTS) factor is monitored for each of the transmission bandwidths. As discussed previously, the CCA factor is a throughput impact estimate based on any CCA transmission deferrals. The RTS factor is a throughput impact estimate based on any transmission deferrals due to unanswered RTS messages.

At block 520, the CCA factor or the RTS factor is used as a basis to dynamically select one of the transmission bandwidths that increases a throughput of the wireless communication device.

FIG. 6 illustrates an exemplary wireless communication device 600 configured to dynamically select a transmission bandwidth that maximizes a throughput of the wireless communication device 600 in accordance with various aspects of the disclosure. For example, the wireless device 600 may be an access point (AP) or a wireless station (STA) as described with reference to FIGS. 1, 2, 3A, 3B, 4A, 4B, and 5.

The wireless device 600 may include processor 610, memory 620, transceiver 630, and antenna 640. Each of these modules may communicate, directly or indirectly, with one another (e.g., via one or more buses).

The memory 620 may include random access memory (RAM) and/or read only memory (ROM). The memory 1010 may store computer-readable, computer-executable software 625 including instructions that, when executed, cause the processor 610 to perform various functions described herein (e.g., monitor a CCA factor or a RTS factor, select a transmission bandwidth, etc.). In some cases, the software 625 may not be directly executable by the processor 610, but may cause a computer (e.g., when compiled and executed) to perform functions described herein. The processor 610 may include an intelligent hardware device, (e.g., a central processing unit (CPU), a microcontroller, an application specific integrated circuit (ASIC), etc.).

The transceiver 630 may communicate bi-directionally, via one or more antennas, wired, or wireless links, with one or more networks, as described above. For example, the transceiver 630 may communicate bi-directionally with an access point AP or a wireless station STA. The transceiver 630 may also include a modem to modulate the packets and provide the modulated packets to the antenna 640 for transmission, and to demodulate packets received from the antenna 640. In some cases, the wireless device 600 may include a single antenna 640. However, in some cases the device may have more than one antenna 640, which may be capable of concurrently transmitting or receiving multiple wireless transmissions.

The processor 610 may be a general-purpose processor, a digital signal processor (DSP), an ASIC, an field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be performed by one or more other processing units (or cores), on at least one integrated circuit (IC). In various examples, different types of ICs may be used (e.g., Structured/Platform ASICs, an FPGA, or another semi-custom IC), which may be programmed in any manner known in the art. The functions of each unit may also be implemented, in whole or in part, with instructions embodied in a memory, formatted to be executed by one or more general or application-specific processors.

The aspects of this disclosure are application to any Wireless Local Area Network (WLAN) communication protocol that uses a listen-before talk-type mechanism, such as Clear Channel Assessment. One example is the IEEE 802.11 protocol, though the disclosure is not limited in this respect.

The techniques of this disclosure may also be described in the following examples.

Example 1. A non-transitory processor-readable storage medium including instructions that, when executed by at least one processor of a wireless communication device configured for any of a plurality of transmission bandwidths, cause the at least one processor to: monitor a Clear Channel Assessment (CCA) factor or a Request-to-Send (RTS) factor for each of the transmission bandwidths, wherein the CCA factor is a throughput impact estimate based on any CCA transmission deferrals, and the RTS factor is a throughput impact estimate based on any transmission deferrals due to unanswered RTS messages; and dynamically select, based on the CCA factor or the RTS factor, one of the transmission bandwidths that increases a throughput of the wireless communication device.

Example 2. The non-transitory processor-readable storage medium of example 1, wherein the instructions further to cause the at least one processor to: monitor the CCA factor and the RTS factor for each of the transmission bandwidths; and dynamically select the transmission bandwidth based on a Packet Error Rate (PER), the CCA factor, and the RTS factor.

Example 3. The non-transitory processor-readable storage medium of example 1, wherein the instructions further to cause the at least one processor to monitor, for each of the respective transmission bandwidths, the CCA factor by: estimating a CCA loss, which is time lost to the CCA transmission deferrals as compared with a currently selected transmission bandwidth; and determining the CCA factor by dividing the CCA loss by a total available transmission time.

Example 4. The non-transitory processor-readable storage medium of example 3, wherein the instructions further to cause the at least one processor to estimate, for each of the respective transmission bandwidths, the CCA loss by: when the transmission bandwidth is busy and lower than or equal to the currently selected transmission bandwidth, leaving the CCA loss same unchanged.

Example 5. The non-transitory processor-readable storage medium of example 3, wherein the instructions further to cause the at least one processor to estimate, for each of the respective transmission bandwidths, the CCA loss by: when the transmission bandwidth is busy and higher than the currently selected transmission bandwidth, incrementing the CCA loss by a duration that the transmission bandwidth is busy.

Example 6. The non-transitory processor-readable storage medium of example 1, wherein the instructions further to cause the at least one processor, for each of the respective transmission bandwidths, to: average the CCA factor and the RTS factor over a predetermined period of time, wherein the dynamic selection is based on the CCA factor average and the RTS factor average.

Example 7. The non-transitory processor-readable storage medium of example 2, wherein the instructions further to cause the at least one processor, for each of the respective transmission bandwidths, to: determine an effective throughput by multiplying a transmission rate by each of the following: one minus the PER, one minus the CCA factor, and one minus the RTS factor, wherein the dynamic selection that increases the throughput is of the transmission bandwidth having a maximum determined effective throughput.

Example 8. The non-transitory processor-readable storage medium of example 1, wherein the instructions further to cause the at least one processor to: dynamically select the transmission bandwidth also based on a latency constraint that limits a maximum number of retransmissions.

Example 9. The non-transitory processor-readable storage medium of example 1, wherein the instructions further to cause the at least one processor to, for each of the respective transmission bandwidths, monitor the RTS factor by: estimating an RTS loss, which is time lost to the transmission deferral due to the one or more unanswered RTS messages; and determining the RTS factor by dividing the RTS loss by a total available transmission time.

Example 10. The non-transitory processor-readable storage medium of example 9, wherein the instructions further to cause the at least one processor, for each of the respective transmission bandwidths, to: estimate the respective RTS loss by adding a backoff plus Arbitration Inter-Frame Spacing (AIFS) period for each unanswered RTS message.

Example 11. The non-transitory processor-readable storage medium of example 1, wherein the wireless communication device is configured to transmit and receive wireless communication signals in accordance with a Wireless Local Area Network (WLAN) communication protocol.

Example 12. The non-transitory processor-readable storage medium of example 11, wherein the WLAN communication protocol is an IEEE 802.11 communication protocol.

Example 13. A wireless communication device configured to communicate over a plurality of transmission bandwidths, comprising: a transceiver configured to transmit and receive wireless signals via transmission bandwidths; at least one processor; and a non-transitory processor-readable storage medium including instructions that, when executed by the at least one processor, cause the at least one processor to: monitor a Clear Channel Assessment (CCA) factor or a Request-to-Send (RTS) factor for each of the transmission bandwidths, wherein the CCA factor is a throughput impact estimate based on any CCA transmission deferrals, and the RTS factor is a throughput impact estimate based on any transmission deferrals due to unanswered RTS messages; and dynamically select, based on the CCA factor or the RTS factor, one of the transmission bandwidths that increases a throughput of the wireless communication device.

Example 14. The wireless communication device of example 13, wherein the wireless communication device is an access point.

Example 15. The wireless communication device of example 13, wherein the wireless communication device is a wireless station configured to communicate with access point.

Example 16. A method for transmission bandwidth selection by a wireless communication device configured for any of a plurality of transmission bandwidths, the method comprising: monitoring a Clear Channel Assessment (CCA) factor or a Request-to-Send (RTS) factor for each of the transmission bandwidths, wherein the CCA factor is a throughput impact estimate based on any CCA transmission deferrals, and the RTS factor is a throughput impact estimate based on any transmission deferrals due to unanswered RTS messages; and dynamically selecting, based on the CCA factor or the RTS factor, one of the transmission bandwidths that increases a throughput of the wireless communication device.

Example 17. The method of example 16, further comprising: monitoring the CCA factor and the RTS factor for each of the transmission bandwidths; and dynamically selecting the transmission bandwidth based on a Packet Error Rate (PER), the CCA factor, and the RTS factor.

Example 18. The method of example 16, further comprising: monitoring, for each of the respective transmission bandwidths, the CCA factor by: estimating a CCA loss, which is time lost to the CCA transmission deferrals as compared with a currently selected transmission bandwidth; and determining the CCA factor by dividing the CCA loss by a total available transmission time.

Example 19. The method of example 18, further comprising: estimating, for each of the respective transmission bandwidths, the CCA loss by, when the transmission bandwidth is busy and lower than or equal to the currently selected transmission bandwidth, leaving the CCA loss same unchanged.

Example 20. The method of example 18, further comprising: estimating, for each of the respective transmission bandwidths, the CCA loss by, when the transmission bandwidth is busy and higher than the currently selected transmission bandwidth, incrementing the CCA loss by a duration that the transmission bandwidth is busy.

Example 21. The method of example 16, further comprising, for each of the respective transmission bandwidths: averaging the CCA factor and the RTS factor over a predetermined period of time, wherein the dynamic selection is based on the CCA factor average and the RTS factor average.

Example 22. The method of example 17, further comprising, for each of the respective transmission bandwidths: determining an effective throughput by multiplying a transmission rate by each of the following: one minus the PER, one minus the CCA factor, and one minus the RTS factor, wherein the dynamic selection that increases the throughput is of the transmission bandwidth having a maximum determined effective throughput.

Example 23. The method of example 16, further comprising: dynamically select the transmission bandwidth also based on a latency constraint that limits a maximum number of retransmissions.

Example 24. The method of example 16, further comprising, for each of the respective transmission bandwidths: monitoring the RTS factor by: estimating an RTS loss, which is time lost to the transmission deferral due to the one or more unanswered RTS messages; and determining the RTS factor by dividing the RTS loss by a total available transmission time.

Example 25. The method of example 24, further comprising, for each of the respective transmission bandwidths: estimating the respective RTS loss by adding a backoff plus Arbitration Inter-Frame Spacing (AIFS) period for each unanswered RTS message.

Example 26. A non-transitory processor-readable storage medium including instructions that, when executed by at least one processor of a wireless communication device configured for any of a plurality of transmission bandwidths, cause the at least one processor to: monitor a Clear Channel Assessment (CCA) factor or a Request-to-Send (RTS) factor for each of the transmission bandwidths, wherein the CCA factor is a throughput impact estimate based on any CCA transmission deferrals, and the RTS factor is a throughput impact estimate based on any transmission deferrals due to unanswered RTS messages; and dynamically select, based on the CCA factor or the RTS factor, one of the transmission bandwidths that increases a throughput of the wireless communication device.

Example 27. The non-transitory processor-readable storage medium of example 26, wherein the instructions further to cause the at least one processor to: monitor the CCA factor and the RTS factor for each of the transmission bandwidths; and dynamically select the transmission bandwidth based on a Packet Error Rate (PER), the CCA factor, and the RTS factor.

Example 28. The non-transitory processor-readable storage medium of any one of examples 26-27, wherein the instructions further to cause the at least one processor to monitor, for each of the respective transmission bandwidths, the CCA factor by: estimating a CCA loss, which is time lost to the CCA transmission deferrals as compared with a currently selected transmission bandwidth; and determining the CCA factor by dividing the CCA loss by a total available transmission time.

Example 29. The non-transitory processor-readable storage medium of any one of examples 26-28, wherein the instructions further to cause the at least one processor to estimate, for each of the respective transmission bandwidths, the CCA loss by: when the transmission bandwidth is busy and lower than or equal to the currently selected transmission bandwidth, leaving the CCA loss same unchanged.

Example 30. The non-transitory processor-readable storage medium of any one of examples 26-29, wherein the instructions further to cause the at least one processor to estimate, for each of the respective transmission bandwidths, the CCA loss by: when the transmission bandwidth is busy and higher than the currently selected transmission bandwidth, incrementing the CCA loss by a duration that the transmission bandwidth is busy.

Example 31. The non-transitory processor-readable storage medium of any one of examples 26-30, wherein the instructions further to cause the at least one processor, for each of the respective transmission bandwidths, to: average the CCA factor and the RTS factor over a predetermined period of time, wherein the dynamic selection is based on the CCA factor average and the RTS factor average.

Example 32. The non-transitory processor-readable storage medium of any one of examples 26-31, wherein the instructions further to cause the at least one processor, for each of the respective transmission bandwidths, to: determine an effective throughput by multiplying a transmission rate by each of the following: one minus the PER, one minus the CCA factor, and one minus the RTS factor, wherein the dynamic selection that increases the throughput is of the transmission bandwidth having a maximum determined effective throughput.

Example 33. The non-transitory processor-readable storage medium of any one of examples 26-32, wherein the instructions further to cause the at least one processor to: dynamically select the transmission bandwidth also based on a latency constraint that limits a maximum number of retransmissions.

Example 34. The non-transitory processor-readable storage medium of any one of examples 26-33, wherein the instructions further to cause the at least one processor to, for each of the respective transmission bandwidths, monitor the RTS factor by: estimating an RTS loss, which is time lost to the transmission deferral due to the one or more unanswered RTS messages; and determining the RTS factor by dividing the RTS loss by a total available transmission time.

Example 35. The non-transitory processor-readable storage medium of any one of examples 26-34, wherein the instructions further to cause the at least one processor, for each of the respective transmission bandwidths, to: estimate the respective RTS loss by adding a backoff plus Arbitration Inter-Frame Spacing (AIFS) period for each unanswered RTS message.

Example 36. The non-transitory processor-readable storage medium of any one of examples 26-35, wherein the wireless communication device is configured to transmit and receive wireless communication signals in accordance with a Wireless Local Area Network (WLAN) communication protocol.

Example 37. The non-transitory processor-readable storage medium of any one of examples 26-36, wherein the WLAN communication protocol is an IEEE 802.11 communication protocol.

Example 38. A wireless communication device configured to communicate over a plurality of transmission bandwidths, comprising: a transceiver configured to transmit and receive wireless signals via transmission bandwidths; at least one processor; and a non-transitory processor-readable storage medium including instructions that, when executed by the at least one processor, cause the at least one processor to: monitor a Clear Channel Assessment (CCA) factor or a Request-to-Send (RTS) factor for each of the transmission bandwidths, wherein the CCA factor is a throughput impact estimate based on any CCA transmission deferrals, and the RTS factor is a throughput impact estimate based on any transmission deferrals due to unanswered RTS messages; and dynamically select, based on the CCA factor or the RTS factor, one of the transmission bandwidths that increases a throughput of the wireless communication device.

Example 39. The wireless communication device of example 38, wherein the wireless communication device is an access point.

Example 40. The wireless communication device of any one of examples 38-, wherein the wireless communication device is a wireless station configured to communicate with access point.

Example 41. A method for transmission bandwidth selection by a wireless communication device configured for any of a plurality of transmission bandwidths, the method comprising: monitoring a Clear Channel Assessment (CCA) factor or a Request-to-Send (RTS) factor for each of the transmission bandwidths, wherein the CCA factor is a throughput impact estimate based on any CCA transmission deferrals, and the RTS factor is a throughput impact estimate based on any transmission deferrals due to unanswered RTS messages; and dynamically selecting, based on the CCA factor or the RTS factor, one of the transmission bandwidths that increases a throughput of the wireless communication device.

Example 42. The method of example 41, further comprising: monitoring the CCA factor and the RTS factor for each of the transmission bandwidths; and dynamically selecting the transmission bandwidth based on a Packet Error Rate (PER), the CCA factor, and the RTS factor.

Example 43. The method of any one of examples 41-42, further comprising: monitoring, for each of the respective transmission bandwidths, the CCA factor by: estimating a CCA loss, which is time lost to the CCA transmission deferrals as compared with a currently selected transmission bandwidth; and determining the CCA factor by dividing the CCA loss by a total available transmission time.

Example 44. The method of any one of examples 41-43, further comprising: estimating, for each of the respective transmission bandwidths, the CCA loss by, when the transmission bandwidth is busy and lower than or equal to the currently selected transmission bandwidth, leaving the CCA loss same unchanged.

Example 45. The method of any one of examples 41-44, further comprising: estimating, for each of the respective transmission bandwidths, the CCA loss by, when the transmission bandwidth is busy and higher than the currently selected transmission bandwidth, incrementing the CCA loss by a duration that the transmission bandwidth is busy.

Example 46. The method of any one of examples 41-45, further comprising, for each of the respective transmission bandwidths: averaging the CCA factor and the RTS factor over a predetermined period of time, wherein the dynamic selection is based on the CCA factor average and the RTS factor average.

Example 47. The method of any one of examples 41-46, further comprising, for each of the respective transmission bandwidths: determining an effective throughput by multiplying a transmission rate by each of the following: one minus the PER, one minus the CCA factor, and one minus the RTS factor, wherein the dynamic selection that increases the throughput is of the transmission bandwidth having a maximum determined effective throughput.

Example 48. The method of any one of examples 41-47, further comprising: dynamically select the transmission bandwidth also based on a latency constraint that limits a maximum number of retransmissions.

Example 49. The method of any one of examples 41-48, further comprising, for each of the respective transmission bandwidths: monitoring the RTS factor by: estimating an RTS loss, which is time lost to the transmission deferral due to the one or more unanswered RTS messages; and determining the RTS factor by dividing the RTS loss by a total available transmission time.

Example 50. The method of any one of examples 41-49, further comprising, for each of the respective transmission bandwidths: estimating the respective RTS loss by adding a backoff plus Arbitration Inter-Frame Spacing (AIFS) period for each unanswered RTS message.

While the foregoing has been described in conjunction with exemplary aspect, it is understood that the term "exemplary" is merely meant as an example, rather than the best or optimal. Accordingly, the disclosure is intended to cover alternatives, modifications and equivalents, which may be included within the scope of the disclosure.

Although specific aspects have been illustrated and described herein, it will be appreciated by those of ordinary skill in the art that a variety of alternate and/or equivalent implementations may be substituted for the specific aspects shown and described without departing from the scope of the present application. This application is intended to cover any adaptations or variations of the specific aspects discussed herein.

The invention claimed is:

1. A non-transitory processor-readable storage medium including instructions that, when executed by at least one processor of a wireless communication device configured for any of a plurality of transmission bandwidths, cause the at least one processor to:
  monitor a Clear Channel Assessment (CCA) factor and a Request-to-Send (RTS) factor for each of the transmission bandwidths, wherein the CCA factor is a throughput impact estimate based on any CCA transmission deferrals, and the RTS factor is a throughput impact estimate based on any transmission deferrals due to unanswered RTS messages; and
  dynamically select, based on a Packet Error Rate (PER), the CCA factor, and the RTS factor, one of the transmission bandwidths that increases a throughput of the wireless communication device.

2. The non-transitory processor-readable storage medium of claim 1, wherein the instructions further to cause the at least one processor to monitor, for each of the respective transmission bandwidths, the CCA factor by:
  estimating a CCA loss, which is time lost to the CCA transmission deferrals as compared with a currently selected transmission bandwidth; and
  determining the CCA factor by dividing the CCA loss by a total available transmission time.

3. The non-transitory processor-readable storage medium of claim 2, wherein the instructions further to cause the at least one processor to estimate, for each of the respective transmission bandwidths, the CCA loss by:
  when the transmission bandwidth is busy and lower than or equal to the currently selected transmission bandwidth, leaving the CCA loss same unchanged.

4. The non-transitory processor-readable storage medium of claim 2, wherein the instructions further to cause the at least one processor to estimate, for each of the respective transmission bandwidths, the CCA loss by:
  when the transmission bandwidth is busy and higher than the currently selected transmission bandwidth, incrementing the CCA loss by a duration that the transmission bandwidth is busy.

5. The non-transitory processor-readable storage medium of claim 1, wherein the instructions further to cause the at least one processor, for each of the respective transmission bandwidths, to:
  average the CCA factor and the RTS factor over a predetermined period of time, wherein the dynamic selection is based on the CCA factor average and the RTS factor average.

6. The non-transitory processor-readable storage medium of claim 1, wherein the instructions further to cause the at least one processor, for each of the respective transmission bandwidths, to:
determine an effective throughput by multiplying a transmission rate by each of the following: one minus the PER, one minus the CCA factor, and one minus the RTS factor,
wherein the dynamic selection that increases the throughput is of the transmission bandwidth having a maximum determined effective throughput.

7. The non-transitory processor-readable storage medium of claim 1, wherein the instructions further to cause the at least one processor to:
dynamically select the transmission bandwidth also based on a latency constraint that limits a maximum number of retransmissions.

8. The non-transitory processor-readable storage medium of claim 1, wherein the instructions further to cause the at least one processor to, for each of the respective transmission bandwidths, monitor the RTS factor by:
estimating an RTS loss, which is time lost to the transmission deferral due to the one or more unanswered RTS messages; and
determining the RTS factor by dividing the RTS loss by a total available transmission time.

9. The non-transitory processor-readable storage medium of claim 8, wherein the instructions further to cause the at least one processor, for each of the respective transmission bandwidths, to:
estimate the respective RTS loss by adding a backoff plus Arbitration Inter-Frame Spacing (AIFS) period for each unanswered RTS message.

10. The non-transitory processor-readable storage medium of claim 1, wherein the wireless communication device is configured to transmit and receive wireless communication signals in accordance with a Wireless Local Area Network (WLAN) communication protocol.

11. The non-transitory processor-readable storage medium of claim 10, wherein the WLAN communication protocol is an IEEE 802.11 communication protocol.

12. A wireless communication device configured to communicate over a plurality of transmission bandwidths, comprising:
a transceiver configured to transmit and receive wireless signals via transmission bandwidths;
at least one processor; and
a non-transitory processor-readable storage medium including instructions that, when executed by the at least one processor, cause the at least one processor to:
monitor a Clear Channel Assessment (CCA) factor and a Request-to-Send (RTS) factor for each of the transmission bandwidths, wherein the CCA factor is a throughput impact estimate based on any CCA transmission deferrals, and the RTS factor is a throughput impact estimate based on any transmission deferrals due to unanswered RTS messages; and
dynamically select, based on a Packet Error Rate (PER), the CCA factor, and the RTS factor, one of the transmission bandwidths that increases a throughput of the wireless communication device.

13. The wireless communication device of claim 12, wherein the wireless communication device is an access point.

14. The wireless communication device of claim 12, wherein the wireless communication device is a wireless station configured to communicate with access point.

15. A method for transmission bandwidth selection by a wireless communication device configured for any of a plurality of transmission bandwidths, the method comprising:
monitoring a Clear Channel Assessment (CCA) factor and a Request-to-Send (RTS) factor for each of the transmission bandwidths, wherein the CCA factor is a throughput impact estimate based on any CCA transmission deferrals, and the RTS factor is a throughput impact estimate based on any transmission deferrals due to unanswered RTS messages; and
dynamically selecting, based on a Packet Error Rate (PER), the CCA factor, and the RTS factor, one of the transmission bandwidths that increases a throughput of the wireless communication device.

16. The method of claim 15, further comprising:
monitoring, for each of the respective transmission bandwidths, the CCA factor by:
estimating a CCA loss, which is time lost to the CCA transmission deferrals as compared with a currently selected transmission bandwidth; and
determining the CCA factor by dividing the CCA loss by a total available transmission time.

17. The method of claim 16, further comprising:
estimating, for each of the respective transmission bandwidths, the CCA loss by, when the transmission bandwidth is busy and lower than or equal to the currently selected transmission bandwidth, leaving the CCA loss same unchanged.

18. The method of claim 16, further comprising:
estimating, for each of the respective transmission bandwidths, the CCA loss by, when the transmission bandwidth is busy and higher than the currently selected transmission bandwidth, incrementing the CCA loss by a duration that the transmission bandwidth is busy.

19. The method of claim 15, further comprising, for each of the respective transmission bandwidths:
averaging the CCA factor and the RTS factor over a predetermined period of time,
wherein the dynamic selection is based on the CCA factor average and the RTS factor average.

20. The method of claim 15, further comprising, for each of the respective transmission bandwidths:
determining an effective throughput by multiplying a transmission rate by each of the following: one minus the PER, one minus the CCA factor, and one minus the RTS factor,
wherein the dynamic selection that increases the throughput is of the transmission bandwidth having a maximum determined effective throughput.

21. The method of claim 15, further comprising:
dynamically select the transmission bandwidth also based on a latency constraint that limits a maximum number of retransmissions.

22. The method of claim 15, further comprising, for each of the respective transmission bandwidths:
monitoring the RTS factor by:
estimating an RTS loss, which is time lost to the transmission deferral due to the one or more unanswered RTS messages; and
determining the RTS factor by dividing the RTS loss by a total available transmission time.

23. The method of claim 22, further comprising, for each of the respective transmission bandwidths:

estimating the respective RTS loss by adding a backoff plus Arbitration Inter-Frame Spacing (AIFS) period for each unanswered RTS message.

24. A non-transitory processor-readable storage medium including instructions that, when executed by at least one processor of a wireless communication device configured for any of a plurality of transmission bandwidths, cause the at least one processor to:

monitor a Request-to-Send (RTS) factor for each of the transmission bandwidths, wherein the RTS factor is a throughput impact estimate based on any transmission deferrals due to unanswered RTS messages; and dynamically select, based on a Packet Error Rate (PER) and the RTS factor, one of the transmission bandwidths that increases a throughput of the wireless communication device.

25. A non-transitory processor-readable storage medium including instructions that, when executed by at least one processor of a wireless communication device configured for any of a plurality of transmission bandwidths, cause the at least one processor to:

monitor a Clear Channel Assessment (CCA) factor for each of the transmission bandwidths wherein the CCA factor is a throughput impact estimate based on any CCA transmission deferrals; and dynamically select, based on a Packet Error Rate (PER) and the CCA factor, one of the transmission bandwidths that increases a throughput of the wireless communication device.

* * * * *